US012031688B1

(12) United States Patent
Wu et al.

(10) Patent No.: US 12,031,688 B1
(45) Date of Patent: Jul. 9, 2024

(54) LED DECORATIVE BULB AND LED LAMP STRING

(71) Applicants: Qingbiao Wu, Fujian (CN); Linlin Wu, Fujian (CN)

(72) Inventors: Qingbiao Wu, Fujian (CN); Linlin Wu, Fujian (CN)

( * ) Notice: Subject to any disclaimer, the term of this patent is extended or adjusted under 35 U.S.C. 154(b) by 0 days.

(21) Appl. No.: 18/534,746

(22) Filed: Dec. 11, 2023

(51) Int. Cl.

| | |
|---|---|
| ***F21K 9/238*** | (2016.01) |
| ***F21V 21/008*** | (2006.01) |
| ***F21V 23/00*** | (2015.01) |
| ***F21V 23/04*** | (2006.01) |
| ***F21V 23/06*** | (2006.01) |
| ***F21W 121/04*** | (2006.01) |
| ***F21Y 115/10*** | (2016.01) |

(52) U.S. Cl.
CPC ............ *F21K 9/238* (2016.08); *F21V 21/008* (2013.01); *F21V 23/001* (2013.01); *F21V 23/003* (2013.01); *F21V 23/04* (2013.01); *F21V 23/06* (2013.01); *F21W 2121/04* (2013.01); *F21Y 2115/10* (2016.08)

(58) Field of Classification Search
CPC ...... F21K 9/238; F21V 21/008; F21V 23/003; F21V 23/04; F21V 23/06; F21Y 2115/10; F21W 2121/04
See application file for complete search history.

(56) References Cited

U.S. PATENT DOCUMENTS

| | | | | |
|---|---|---|---|---|
| 7,508,141 B2 * | 3/2009 | Wong | H05B 47/155 315/185 S | |
| 11,019,706 B1 * | 5/2021 | McRae | H05B 45/20 | |
| 2016/0157311 A1 * | 6/2016 | Peng | H05B 45/20 315/186 | |
| 2018/0376566 A1 * | 12/2018 | Newton | F21S 4/24 | |

* cited by examiner

*Primary Examiner* — Mary Ellen Bowman

(57) ABSTRACT

An LED decorative bulb and an LED lamp string containing a plurality of LED decorative bulbs. Each LED decorative bulb contains a housing and a light source assembly inside the housing; the light source assembly has a driving circuit and some LED light sources; the driving circuit contains a rectifier, a digital signal decoder, a plurality of switch tubes, a diode, a capacitor, a first power supply end and a second power supply end; the driving circuit and the LED light sources are so connected that the LED light sources receives higher voltages to increase brightness and thereby enhancing the decorative effects.

7 Claims, 6 Drawing Sheets

LED DECORATIVE BULB AND LED LAMP STRING

BACKGROUND OF THE INVENTION

The present invention relates to the technical field of decorative lighting, in particular to an LED decorative bulb and an LED lamp string.

An LED lamp string is formed by connecting various LED decorative bulbs through a wire, and is mainly used for interior decoration and exterior decoration, for example, the LED lamp string can be used for decorating Christmas trees or for general house decoration.

At present, in case at least two LED lamp strings are used, power supply input ends of all the LED lamp strings are connected to a control end of an MCU controller, and the LED lamp strings are connected in parallel. However, since LED light sources of the LED lamp strings in the existing market are connected in series, a voltage of the LED light source of each LED lamp string in the market is therefore low (generally about 3V in the market), the brightness of the LED lamp strings is also low, and the overall effect is poor.

BRIEF SUMMARY OF THE INVENTION

The present invention aims to provide an LED decorative bulb and an LED lamp string with high brightness and good decorative effects.

In order to achieve the above objects, the present invention provides the following technical solutions:

An LED decorative bulb, comprising a lamp housing and a light source assembly disposed in the lamp housing; the light source assembly comprises a driving circuit and at least two LED light sources, the driving circuit comprises a rectifier, a digital signal decoder, a plurality of switch tubes, a diode, a capacitor, a first power supply end and a second power supply end; each of the switch tubes corresponds to a respective LED light source; each of the switch tubes is a triode; the rectifier comprises a rectifier first end, a rectifier second end, a rectifier third end, and a rectifier fourth end; the capacitor comprises a capacitor first end and a capacitor second end; each of the LED light sources comprises an LED light source first end and an LED light source second end; the digital signal decoder comprises a VDD end, a GND end, and a plurality of signal output ends; the rectifier first end is connected with the first power supply end; the rectifier second end is connected to the VDD end of the digital signal decoder, a cathode of the diode, and the capacitor first end; the rectifier third end is connected with the second power supply end; the rectifier fourth end, an anode of the diode, and the capacitor second end are connected with the GND end of the digital signal decoder; an emitting electrode of each of the switch tubes is connected with the VDD end of the digital signal decoder; a base electrode of each of the switch tubes is connected with a corresponding signal output end of the digital signal decoder; a collector electrode of each of the switch tubes is connected with the LED light source first end of a corresponding LED light source; and each LED light source second end is connected with the GND end of the digital signal decoder.

Each of the switch tubes is a PNP triode.

The driving circuit further comprises a plurality of resistors; each of the resistors comprises a resistor first end and a resistor second end; the resistors comprises a first resistor, a second resistor and at least two third resistors; the rectifier fourth end is connected with the GND end of the digital signal decoder through the first resistor; LED light source second ends of the LED light sources are connected with the resistor first end of the first resistor through the second resistor; the resistor second end of the first resistor is connected with the anode of the diode; and the base electrode of each of the switch tubes is connected with the corresponding signal output end of the digital signal decoder through a corresponding third resistor.

Each LED light source first end is a positive electrode end, and each LED light source second end is a negative electrode end.

An LED lamp string, comprising two wires, a plurality of lamp seats, and a plurality of LED decorative bulbs; each of the lamp seats correspond to a corresponding LED decorative bulb; each of the lamp seats is provided with a first power supply connector end and a second power supply connector end, wherein the first power supply connector end is connected with one of the wires, and the second power supply connector end is connected with another one of the wires.

The two wires are each provided with a wire first end and a wire second end; two wire first ends of the two wires are connected to a wire plug; two wire second ends of the two wires are connected to a connector.

Alternatively, the two wires are each provided with a wire first end and a wire second end; two wire first ends of the two wires are connected to a connector; two wire second ends of the two wires are connected to another connector or to an end cap; wherein said connector connected with the two wire first ends is connected to a control connector through a conversion wire; an MCU controller is further provided; the MCU controller is connected with said control connector; the MCU controller comprises an MCU power supply first end and an MCU power supply second end; the MCU power supply first end and the MCU power supply second end correspond to the two wires respectively, and are both connected with a power supply plug.

According to the above structures, the LED decorative bulb of the present invention has the following beneficial effects: in the present invention, high-voltage carrier signals are input into the rectifier, and after the high-voltage carrier signals are rectified and subject to voltage division, they are input to the digital signal decoder, and after decoding by the digital signal decoder, are then output to each LED light source, and since the decoded signals will first pass through the corresponding switch tubes and then output to the LED light sources, and the switch tubes are activated in a high-voltage state, higher voltage is provided for the LED light sources, the brightness of the LED light sources is higher, and the brightness of the LED decorative bulb is ensured.

According to the above structures, the LED lamp string of the present invention has the following beneficial effects: the LED decorative bulbs are connected in parallel to form the LED lamp string, where the LED decorative bulbs are high in brightness and are controlled by the MCU controller, and each LED decorative bulb receives digital carrier signal change cycle extracted, decoded and output by the digital signal decoder, so that each LED light source in each LED decorative bulb is driven, therefore, each LED decorative bulb is enabled to flash and change color according to the preset function, the decorative effect is good, and the brightness is high.

Figure 1:
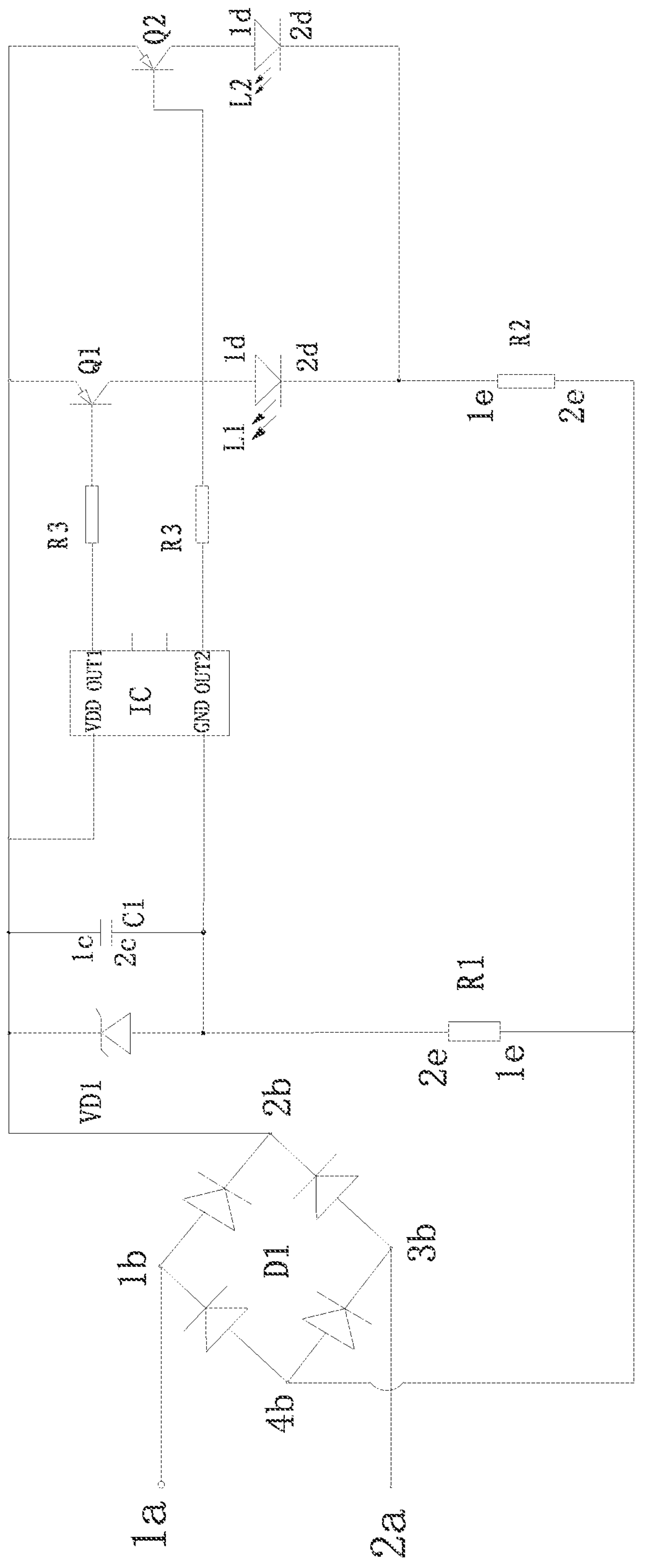
FIG. 1 is a schematic diagram of circuit connection of Embodiment 1.

In the figures: 4—wire; 42—lamp holder; 5—MCU controller; 51—control connector; 52—power supply plug; 6—lamp housing; 61—lamp seat; 611—first power supply connector end; 612—second power supply connector end; 7—wire plug; 8—connector; 81—end cap; 90—LED decorative bulb; 91—conversion wire; 1*a*—first power supply end; 2*a*—second power supply end; 1*b*—rectifier first end; 2*b*—rectifier second end; 3*b*—rectifier third end; 4*b*—rectifier fourth end; 1*c*—capacitor first end; 2*c*—capacitor second end; 1*d*—LED light source first end; 2*d*—LED light source second end; 1*e*—resistor first end; 2*e*—resistor second end; 1*f*—MCU power supply first end; and 2*f*—MCU power supply second end.

DETAILED DESCRIPTION OF THE INVENTION

To further explain the technical solutions of the present invention, the present invention is described in detail below through specific embodiments.

An LED decorative bulb, as shown in FIGS. 1-6, comprises a lamp housing 6 and a light source assembly disposed in the lamp housing 6, the light source assembly comprises a driving circuit and at least two light emitting components, each light emitting component is an LED light source in the present embodiment, the driving circuit comprises a rectifier D1, a digital signal decoder IC, a plurality of switch tubes, a diode VD1, a capacitor C1, a first power supply end 1*a* and a second power supply end 2*a*; each switch tube corresponds to a respective LED light source, in other words, each LED light source is provided with one switch tube, which is a triode, and each switch tube is a conventional PNP triode in the present embodiment. The rectifier is an existing conventional rectifier bridge, the rectifier comprises a rectifier first end 1*b*, a rectifier second end 2*b*, a rectifier third end 3*b* and a rectifier fourth end 4*b*, the capacitor C1 comprises a capacitor first end 1*c* and a capacitor second end 2*c*, the digital signal decoder IC comprises a VDD end, a GND end and a plurality of signal output ends, and each LED light source comprises an LED light source first end 1*d* and an LED light source second end 2*d*.

The driving circuit is connected to each LED light source according to the following: the rectifier first end 1*b* is connected with the first power supply end 1*a*; the rectifier second end 2*b*, a cathode of the diode VD1 and the capacitor first end 1*c* are connected with the VDD end of the digital signal decoder IC; the rectifier third end 3*b* is connected with the second power supply end 2*a*; the rectifier fourth end 4*b*, an anode of the diode VD1 and the capacitor second end 2*c* are connected with the GND end of the digital signal decoder IC; an emitting electrode of each switch tube is connected with the VDD end of the digital signal decoder IC; a base electrode of each switch tube is connected with a corresponding signal output end of the digital signal decoder IC; a collector electrode of each switch tube is connected with the LED light source first end 1*d* of a corresponding LED light source; and each LED light source second end 2*d* is connected with the GND end of the digital signal decoder IC.

Preferably, in order to perform voltage division, the driving circuit further comprises a plurality of resistors; each resistor comprises a resistor first end 1*e* and a resistor second end 2*e*; the resistors comprises a first resistor R1, a second resistor R2 and at least two third resistors R3; each switch tube is provided with a corresponding third resistor R3; the rectifier fourth end 4*b* is connected with the GND end of the digital signal decoder IC through the first resistor R1; the LED light source second ends 2*d* are connected with the resistor first end 1*e* of the first resistor R1 through the second resistor R2, the resistor second end 2*e* of the first resistor R1 is connected with the anode of the diode VD1, and the base electrode of each switch tube is connected with the corresponding signal output end of the digital signal decoder IC through the corresponding third resistor R3. The signal output ends of the digital signal decoder IC comprises an OUT1 end, an OUT2 end, . . . and OUTn end respectively, and n is a positive integer greater than 1.

Further, the first power supply end 1*a* and the second power supply end 2*a* together define a power supply end of the light source assembly. In the present embodiment, the first power supply end 1*a* is a positive electrode end, and the second power supply end 2*a* is a negative electrode end. In the present embodiment, an alternating current (AC) power supply or a direct current (DC) power supply may be input into the power supply end so as to supply power to the LED decorative bulb of the present invention, wherein the alternating current power supply is an existing conventional power supply, such as mains power, and the direct current power supply is also an existing conventional power supply, which will not be further described herein.

Further, in the present embodiment, all the LED light source first ends 1*d* are positive electrode ends, and all the LED light source second ends 2*d* are negative electrode ends. The arrangement of positive and negative electrode ends of the LED light source first ends 1*d* and the LED light source second ends 2*d* are conventional technique according to the actual circuit loop, which will not be described herein.

It should be noted that the digital signal decoder IC of the present invention employs an existing conventional digital decoder.

The decorative bulb of the present invention has the following specific working process: the rectifier first end 1*b* and the rectifier third end 3*b* of the rectifier receive high-voltage carrier digital signals (for example in a voltage of 120V), the rectifier rectifies the high-voltage carrier digital signals, then the high-voltage carrier digital signals are input into the digital signal decoder IC after voltage division, and in the digital signal decoder IC, the high-voltage carrier digital signals are identified and decoded to extract high-voltage carrier digital signals change cycles as decoded from a power supply, and then output the decoded and extracted signals, wherein said power supply is an input voltage between the first power supply end 1*a* and the second power supply end 2*a*; since the decoded and extracted signals output by the digital signal decoder IC are still high-voltage signals, corresponding switch tubes are activated, so that the decoded and extracted signals are then output to the LED light sources respectively to drive each LED light source to flash and change color according to a preset program; wherein said preset program is embedded in the signals eventually received by the LED light sources.

In the present embodiment, for the convenience of understanding, examples with two, three, and four LED light sources respectively are illustrated as follows.

Embodiment 1

As shown in FIG. 1, the present embodiment has two LED light sources, the two LED light sources are an LED light source L1 and an LED light source L2 respectively; the LED light source L1 is provided with a switch tube Q1, the LED light source L2 is provided with a switch tube Q2, and a specific circuit connection is as follows: emitting electrodes of the switch tube Q1 and the switch tube Q2 are both connected with the VDD end of the digital signal decoder IC; a base electrode of the switch tube Q1 is connected with a signal output end OUT1 of the digital signal decoder through a corresponding third resistor R3, a base electrode of the switch tube Q2 is connected with another signal output end OUT2 of the digital signal decoder through another corresponding third resistor R3; a collector electrode of the switch tube Q1 is connected with a positive electrode end of the LED light source L1, a collector electrode of the switch tube Q2 is connected with a positive electrode end of the LED light source L2; negative electrode ends of the LED light source L1 and the LED light source L2 are both connected with a resistor first end 1*e* of the second resistor R2, and a resistor second end 2*e* of the second resistor R2 is connected with a resistor first end 1*e* of the first resistor R1. Thus, the two LED light sources are connected in parallel and controlled by the same digital signal decoder IC.

In the present embodiment, resistance of the first resistor R1 is 33 KΩ, resistance of the second resistor R2 is 47 KΩ, and resistance of each third resistor R3 is 10 KΩ.

In the present embodiment, the two LED light sources are disposed in the lamp housing to ensure the brightness of the LED decorative bulb, thereby achieving a good decorative effect.

Embodiment 2

Figure 2:
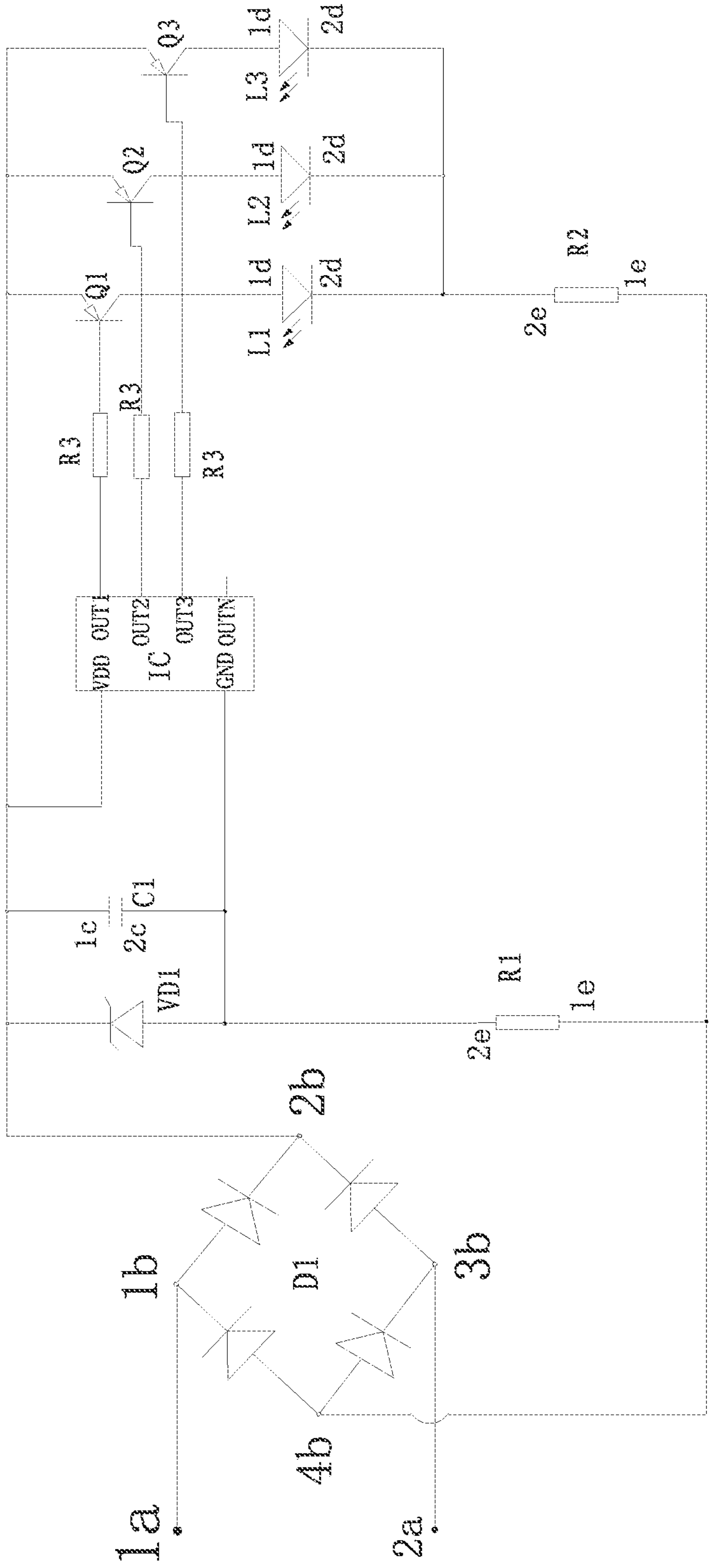
FIG. 2 is a schematic diagram of circuit connection of Embodiment 2.

As shown in FIG. 2, embodiment 2 is different from Embodiment 1 in that there are three LED light sources, and the three LED light sources are an LED light source L1, an LED light source L2, and an LED light source L3, wherein the LED light source L1 is provided with a switch tube Q1, the LED light source L2 is provided with a switch tube Q2, and the LED light source L3 is provided with a switch tube Q3; the specific circuit connection is the same as embodiment 1 and therefore will not be described repeatedly herein.

Embodiment 3

Figure 3:
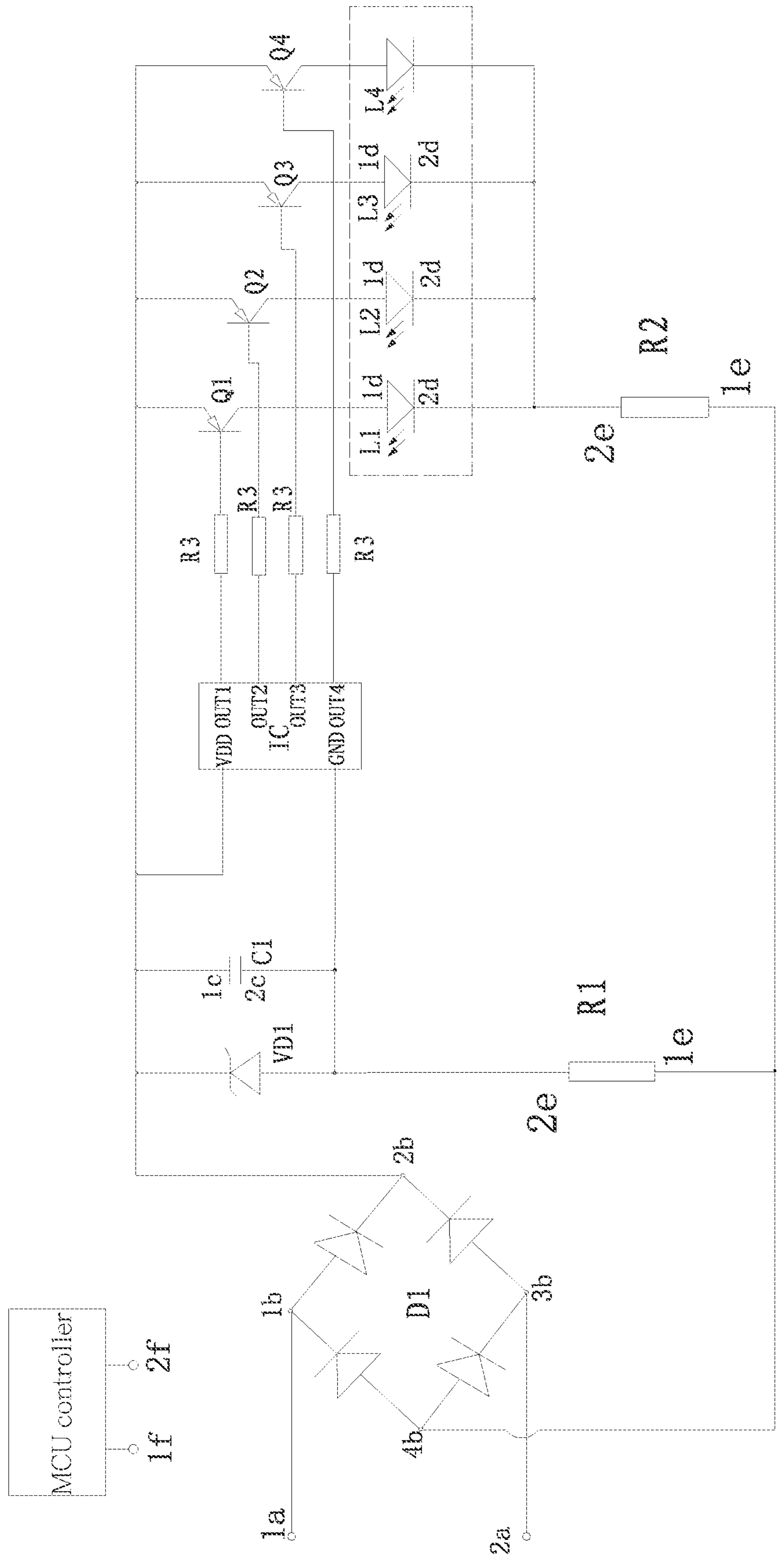
FIG. 3 is a schematic diagram of circuit connection of Embodiment 3.

As shown in FIG. 3, the present embodiment is different from Embodiment 1 in that there are four LED light sources, and the four LED light sources are an LED light source L1, an LED light source L2, an LED light source L3, and an LED light source L4, wherein the LED light source L1 is provided with a switch tube Q1, the LED light source L2 is provided with a switch tube Q2, the LED light source L3 is provided with a switch tube Q3, and the LED light source L4 is provided with a switch tube Q4; the specific circuit connection is the same as above, and therefore will not be described repeatedly herein.

It should be noted that a quantity of the LED light sources may be selected according to actual situations, such as frequent requirements or required brightness, and is not limited to the quantity disclosed by the above embodiments.

In the present invention, under the condition of the same voltage, the colors of the LED decorative bulbs in embodiment 1 to embodiment 3 are different due to the different quantities of the LED light sources; the more the LED light sources are provided, the richer the colors are, and also the higher the brightness of the corresponding LED decorative bulb as contributed by all the LED light sources in the LED decorative bulb, so that the overall decorative effect is good.

Figure 4:
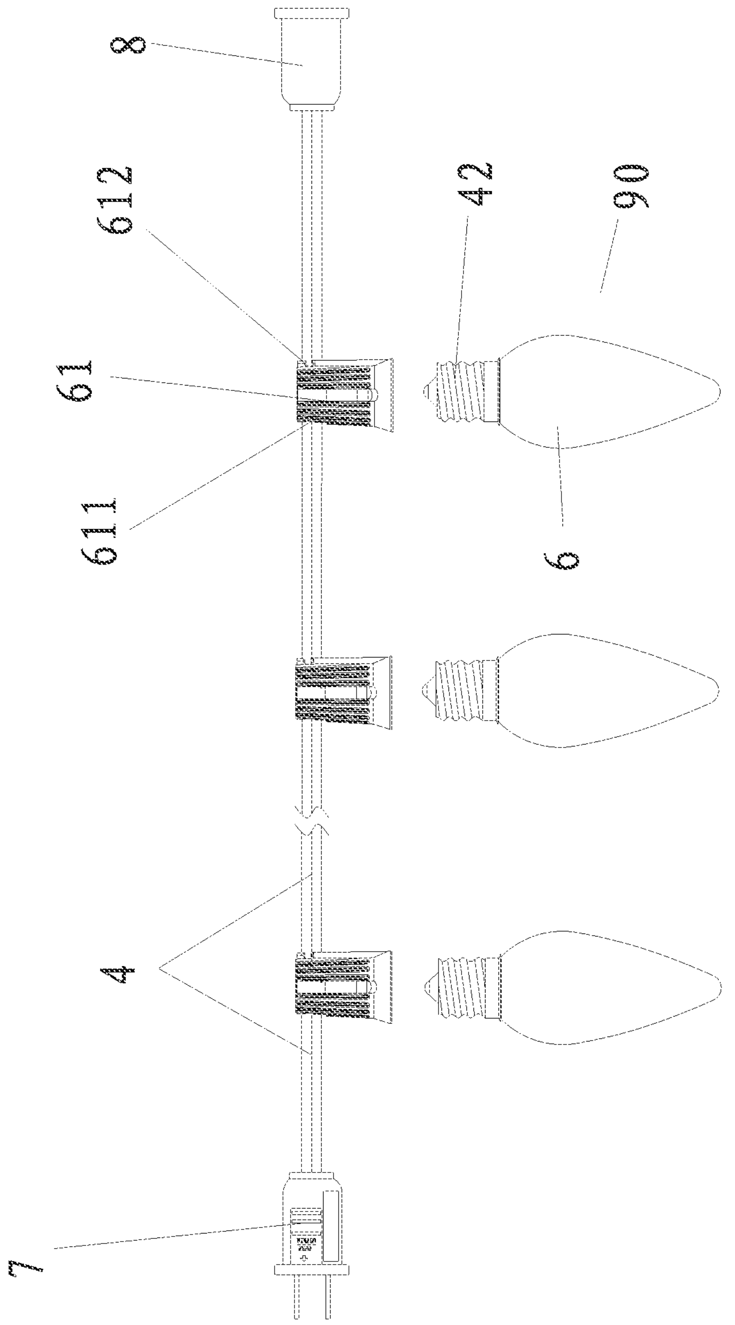
FIG. 4 is an assembly schematic diagram of LED decorative bulbs according to the present invention.

The present invention further discloses an LED lamp string. As shown in FIG. 4, the LED lamp string comprises two wires 4 and a plurality of LED decorative bulbs 90, the first power supply end 1*a* of each LED decorative bulb 90 is electrically connected with one of the wires 4, and the second power supply end 2*a* of each LED decorative bulb is electrically connected with another one of the wires 4, such that all the LED decorative bulbs 90 are connected in parallel, the two wires 4 are each provided with a wire first end and a wire second end, wire first ends of the two wires 4 are connected to a wire plug 7, two wire second ends of the two wires 4 are connected to a connector 8, the connector 8 is configured to connect another adjacent LED lamp string; the wire plug 7 is configured to be inserted into a conventional power socket to supply power to the LED lamp string, wherein the wire plug 7 may be a plug used in the existing market, or the wire plug 7 may also be a conventional USB interface to facilitate connection with a rechargeable battery.

Further, the LED lamp string further comprises a plurality of lamp seats 61, each of the lamp seats 61 correspond to a corresponding LED decorative bulb 90, each of the lamp seats 61 is provided with a first power supply connector end 611 and a second power supply connector end 612, wherein the first power supply connector end 611 is connected with one of the wires 4, and the second power supply connector end 612 is connected with another one of the wires 4, so that the lamp seats 61 are connected in parallel, and a mounting structure between each LED decorative bulb 90 and a corresponding lamp seat 61 will be described below.

It should be noted that, each LED decorative bulb is provided according to the aforementioned structure, and a quantity of the LED decorative bulbs is determined according to actual situations.

Figure 5:
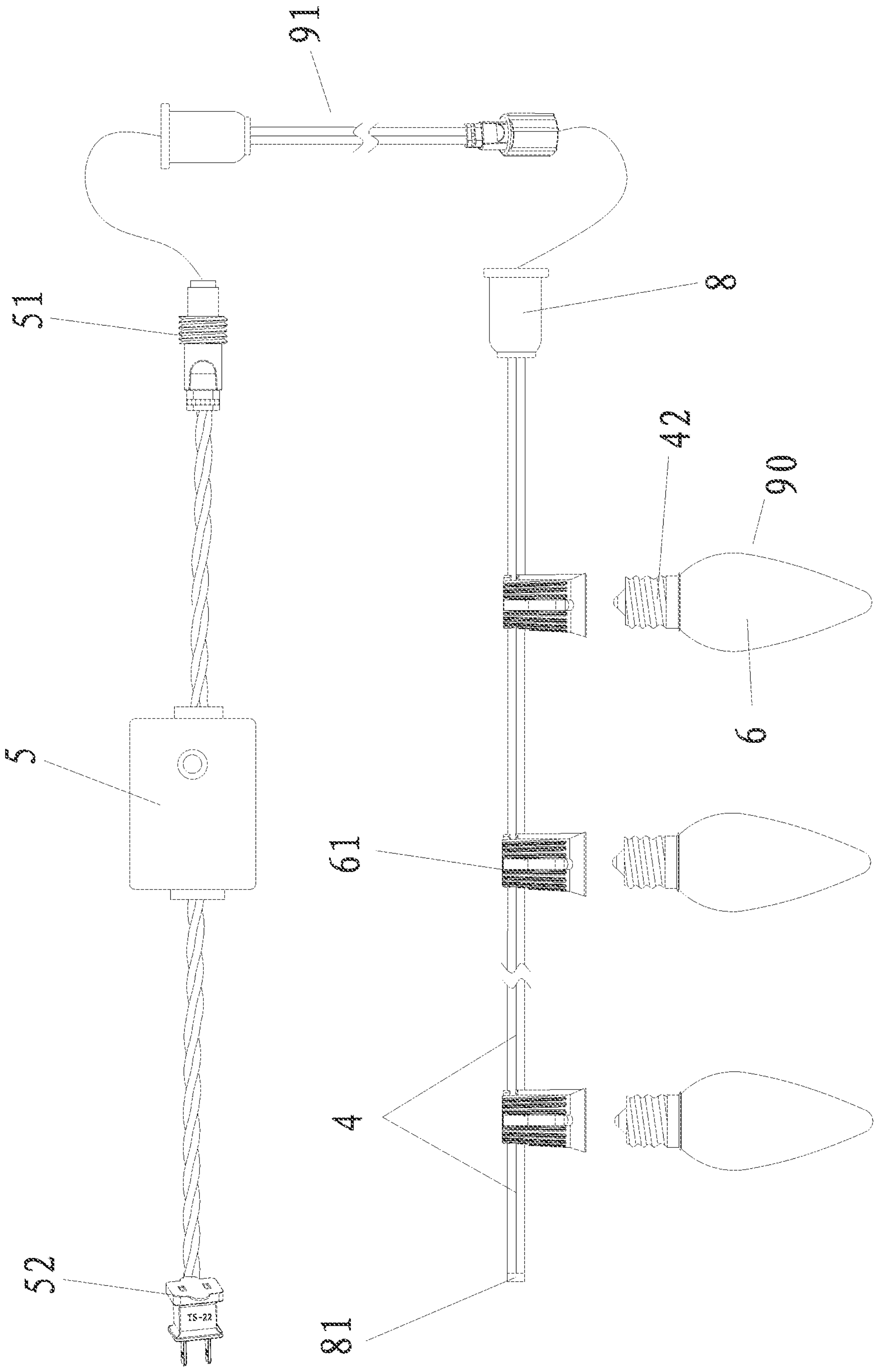
FIG. 5 is an assembly schematic diagram of an LED lamp string according to the present invention.
Figure 6:
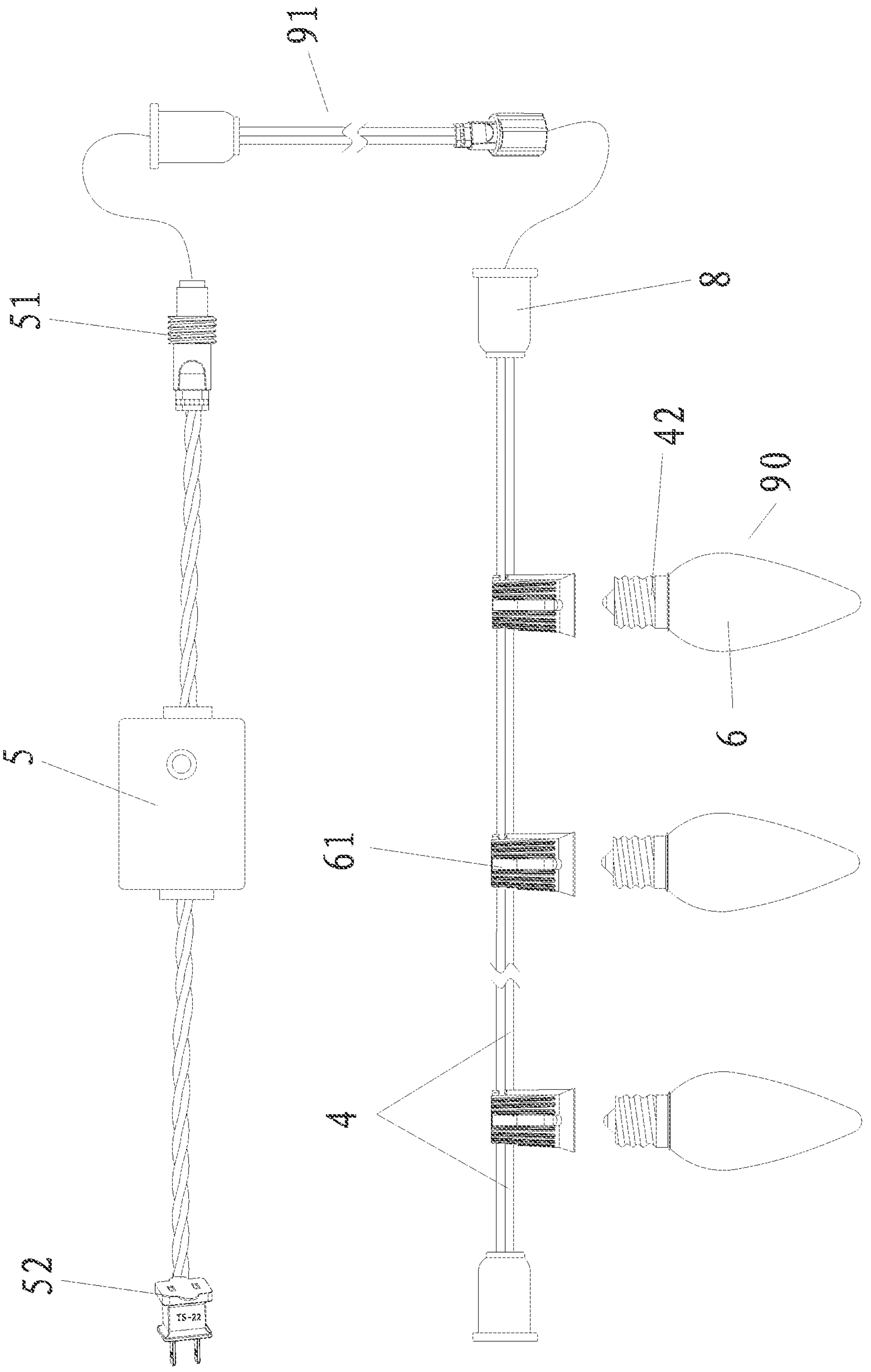
FIG. 6 is another assembly schematic diagram of an LED lamp string according to another embodiment of the present invention.

Preferably and alternatively, as shown in FIGS. 5-6, the LED lamp string comprises an MCU controller 4, the wire first ends of the two wires 4 are connected to a connector 8, while the wire second ends of the two wires are both connected with another connector 8 as shown in FIG. 6 or with an end cap 81 as shown in FIG. 5, depending on actual requirements; in case the wire second ends of the two wires are connected with said another connector 8, said another connector 8 is optionally connected to another adjacent LED lamp string, and said connector 8 connected with the wire first ends of the two wires 4 is connected with a control connector 51 of the MCU controller 5 through a conventional conversion wire 91, which is a conventional structural connection and thus will not be described in detail; a power supply end of the MCU controller 5 is connected with a power supply plug 52; the power supply end of the MCU controller 5 comprises an MCU power supply first end 1*f* and an MCU power supply second end 2*f*, which are connected with corresponding ends of the power supply plug 52 respectively, so that power is supplied to the LED lamp string through the MCU controller 5.

Specifically, the MCU power supply first end 1*f* and the MCU power supply second end 2*f* correspond to the two wires 4 respectively, so as to supply power to the LED lamp string through the MCU controller 5, wherein the MCU power supply first end 1*f* and the MCU power supply second end 2*f* are both connected with the power supply plug 52, so as to supply power to each LED decorative bulb through the MCU controller 5.

In the present embodiment, the MCU controller can be operated by keys, by remote controller, or by a mobile phone APP; by using a power supply output end of the MCU controller 5 that modulates an operation of the MCU controller 5 according to a preset program to the MCU controller 5, high-voltage carrier digital signals are formed at the power supply output end of the MCU controller 5, and the same is output to each LED decorative bulb, so that each LED decorative bulb flashes and changes color, wherein, it is a known technology in the prior art to use the digital signal decoder to realize the flashing and color change of the LED light sources, and it is also a known technology in the prior art to preset a program in the MCU controller to realize the flashing and color change, and therefore their details are not presented repeatedly herein.

Further, in the present application, the LED decorative bulb further comprises an LED circuit board which is the LED circuit board described in pending U.S. application Ser. No. 18/226,272 titled "NOVEL LED CIRCUIT BOARD" invented by the same inventors of the present invention; wherein the lamp holder 42 mentioned in the prior application may be installed with the lamp seat 61 of the present invention in a conventional manner, so that the LED decorative bulbs 90 of each LED lamp string are being supplied with power; said lamp holder 42 is a holder arranged on each LED decorative bulb 90. In addition, the first lead of the electronic components of the LED circuit board mentioned in the prior application is electrically connected with the first power supply end 1*a* of the LED decorative bulb, and the second lead of the electronic components of the LED circuit board is electrically connected with the second power supply end 2*a* of the LED decorative bulb.

The above description is only preferred embodiments of the present invention, and all equivalent changes and modifications made within the scope of the claims of the present invention should fall within the scope of the claims of the present invention.

What is claimed is:

1. An LED decorative bulb, comprising a lamp housing and a light source assembly disposed in the lamp housing; the light source assembly comprises a driving circuit and at least two LED light sources, wherein the driving circuit comprises a rectifier, a digital signal decoder, a plurality of switch tubes, a diode, a capacitor, a first power supply end and a second power supply end; each of the switch tubes corresponds to a respective LED light source; each of the switch tubes is a triode; the rectifier comprises a rectifier first end, a rectifier second end, a rectifier third end, and a rectifier fourth end; the capacitor comprises a capacitor first end and a capacitor second end; each of the LED light sources comprises an LED light source first end and an LED light source second end; the digital signal decoder comprises a VDD end, a GND end, and a plurality of signal output ends; the rectifier first end is connected with the first power supply end; the rectifier second end is connected to the VDD end of the digital signal decoder, a cathode of the diode, and the capacitor first end; the rectifier third end is connected with the second power supply end; the rectifier fourth end, an anode of the diode, and the capacitor second end are connected with the GND end of the digital signal decoder; an emitting electrode of each of the switch tubes is connected with the VDD end of the digital signal decoder; a base electrode of each of the switch tubes is connected with a corresponding signal output end of the digital signal decoder; a collector electrode of each of the switch tubes is connected with the LED light source first end of a corresponding LED light source; and each LED light source second end is connected with the GND end of the digital signal decoder.

2. The LED decorative bulb of claim 1, wherein each of the switch tubes is a PNP triode.

3. The LED decorative bulb of claim 2, wherein the driving circuit further comprises a plurality of resistors; each of the resistors comprises a resistor first end and a resistor second end; the resistors comprises a first resistor, a second resistor and at least two third resistors; the rectifier fourth end is connected with the GND end of the digital signal decoder through the first resistor; LED light source second ends of the LED light sources are connected with the resistor first end of the first resistor through the second resistor; the resistor second end of the first resistor is connected with the anode of the diode; and the base electrode of each of the switch tubes is connected with the corresponding signal output end of the digital signal decoder through a corresponding third resistor.

4. The LED decorative bulb of claim 1, wherein each LED light source first end is a positive electrode end, and each LED light source second end is a negative electrode end.

5. An LED lamp string, comprising two wires, a plurality of lamp seats, and a plurality of LED decorative bulbs each being the LED decorative bulb defined in claim 1; wherein each of the lamp seats corresponds to a corresponding LED decorative bulb; each of the lamp seats is provided with a first power supply connector end and a second power supply connector end; the first power supply connector end is connected with one of the wires, and the second power supply connector end is connected with another one of the wires.

6. The LED lamp string of claim 5, wherein the two wires are each provided with a wire first end and a wire second end; wire first ends of the two wires are connected to a wire plug; wire second ends of the two wires are connected to a connector.

7. The LED lamp string of claim 5, further comprising an MCU controller; the MCU controller is connected with a control connector; the two wires are each provided with a wire first end and a wire second end; two wire first ends of the two wires are connected to a connector or to an end cap; two wire second ends of the two wires are connected to another connector; wherein said connector connected with the two wire first ends is connected to the control connector through a conversion wire; the MCU controller comprises an MCU power supply first end and an MCU power supply second end; the MCU power supply first end and the MCU power supply second end correspond to the two wires respectively, and are both connected with a power supply plug.

* * * * *